United States Patent [19]

DeRees

[11] Patent Number: 4,768,808
[45] Date of Patent: Sep. 6, 1988

[54] AXLE BEAM AND STEERING ASSEMBLY MOUNT

[75] Inventor: Delbert D. DeRees, Romeo, Mich.

[73] Assignee: American Motors Corporation, Southfield, Mich.

[21] Appl. No.: 65,300

[22] Filed: Jun. 22, 1987

[51] Int. Cl.$^4$ .............................................. B62D 21/00
[52] U.S. Cl. ..................................... 280/796; 180/905
[58] Field of Search ....................... 180/253, 148, 905; 280/95 R, 96, 796

[56] References Cited

U.S. PATENT DOCUMENTS

| | | | |
|---|---|---|---|
| 1,091,751 | 3/1914 | Brock et al. | 72/333 |
| 1,108,114 | 8/1914 | Alden | 74/607 |
| 1,212,635 | 1/1917 | Heaslet | 74/607 |
| 1,903,088 | 3/1933 | Blackmore | 74/607 |
| 2,027,898 | 1/1936 | Broulhiet | 280/796 |
| 2,848,055 | 8/1958 | Toulmin, Jr. | 180/256 |
| 3,083,031 | 3/1963 | Elwell | 280/96 |
| 3,673,888 | 7/1972 | Moll et al. | 74/607 |
| 3,690,399 | 9/1972 | Bokovoy et al. | 180/75 |
| 4,003,444 | 1/1977 | Nobutomo et al. | 180/75 |
| 4,506,747 | 3/1985 | Wykhuis | 180/62 |
| 4,540,220 | 9/1985 | Roeth et al. | 301/125 |

Primary Examiner—Kenneth R. Rice
Attorney, Agent, or Firm—Brooks & Kushman

[57] ABSTRACT

An axle beam for supporting drivetrain and steering components of a motor vehicle comprises a first elongated channel member having a substantially hat-shaped cross section including first and second sidewalls, a bottom wall having a longitudinal edge at one edge of each of the sidewalls, and side flanges extending outwardly from the other edges of the sidewalls. A second elongated member includes surface portions registering with and bonded to the side flanges of the first member. An end plate is secured at each longitudinal end of the beam and is configured to support a wheel spindle support knuckle. Additional steering structure including the steering control assembly can be mounted on sidewalls of the beam. Additional reinforcement can be provided to the axle beam by corrugated web panels inserted within the longitudinal channel as well as by flanged apertures formed in the sidewalls of the first elongated member. Preferably, the first and second elongated members are stamped to conveniently form corresponding configurations which further serve to reinforce the axle beam and provide clearance for adjacent vehicle components.

24 Claims, 2 Drawing Sheets

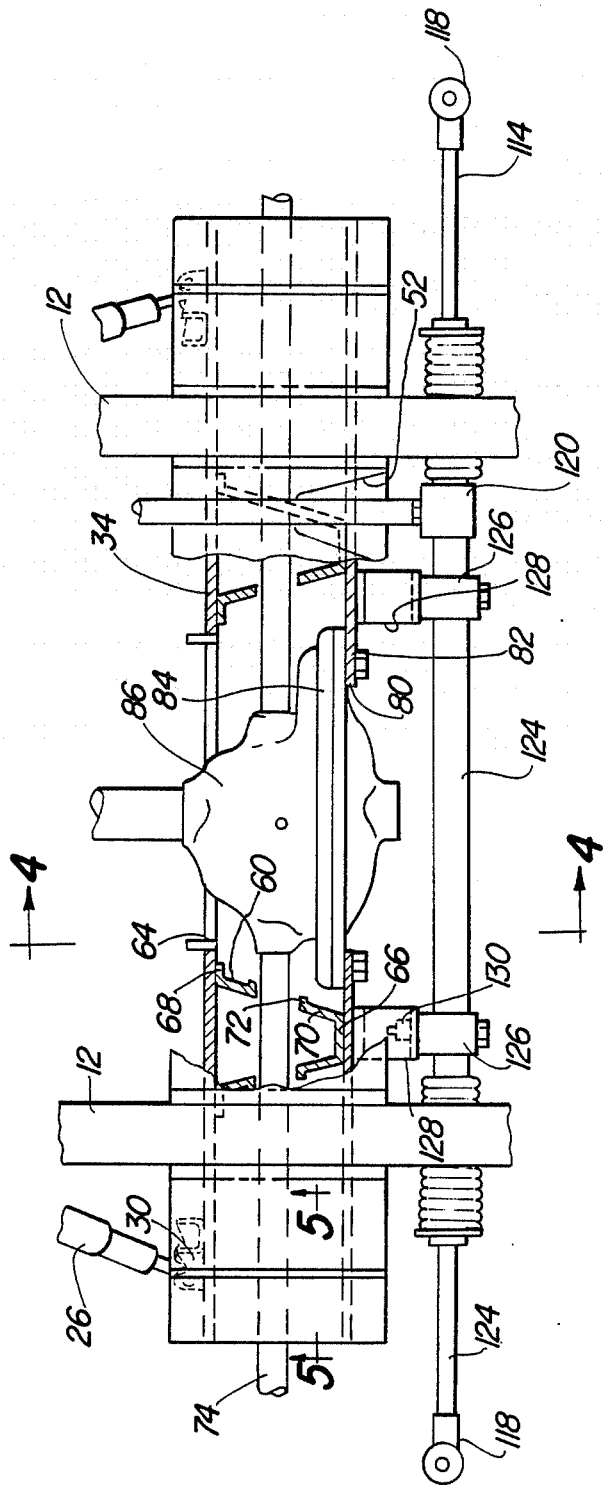
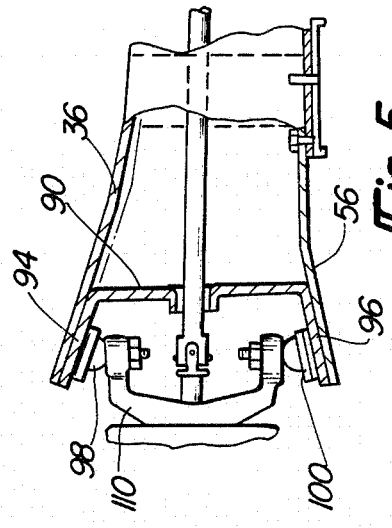
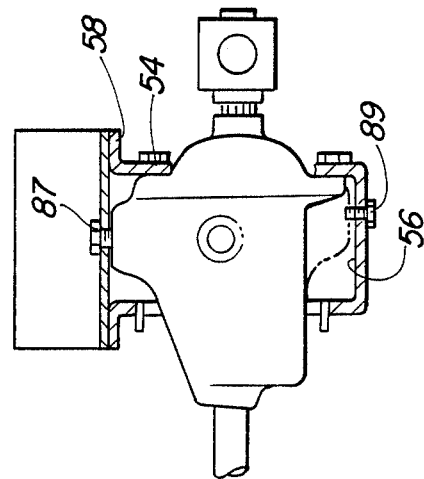

AXLE BEAM AND STEERING ASSEMBLY MOUNT

BACKGROUND OF THE INVENTION

I. Field of the Present Invention

The present invention relates generally to vehicle axle housings, and more particularly to a stamped axle beam housing adapted to provide rigid structural support for a steering assembly.

II. Description of the Prior Art

There are many known motor vehicle constructions in which axle shafts are enclosed within an axle housing. While such housings can be made from a casting process, such a process requires intensive metallurgy control. Consequently, it may be appreciated that production of vehicle parts by stamping the parts from sheet material is substantially less expensive and thus more desirable for mass production purposes. For example, U.S. Pat. No. 1,108,114 to Alden discloses an axle housing formed from two separately stamped pieces which are joined together by welds along mating edges of each piece. In addition, the pieces form an enlarged central portion which is open at the front and back so as to receive the differential gear housing, and a tubular brake spider hub can be received over and mounted to the ends of the axle housing.

Other previously known multiple piece axle housings require numerous manufacturing and assembly operations. U.S. Pat. No. 1,903,088 to Blackmore discloses an axle housing structure comprising a plurality of individually stamped parts which must be secured together. U.S. Pat. No. 4,003,444 to Nobutomo et al discloses a multiple piece axle housing including a flat tubular portion which provides a mating surface to which a fender can be welded. U.S. Pat. No. 3,690,399 to Bokovoy et al discloses an axle housing construction which includes means for lockingly engaging the housing with a brake backing plate and a bearing retaining cover.

None of the known prior art references disclose an axle housing construction in the form of a beam which forms a mount for a steering assembly for the motor vehicle. In particular, none of the previously known axle beam housings include any support for a steering knuckle. Moreover, none of the known prior art references teach any means for securing or supporting a steering gear assembly upon the axle housing.

SUMMARY OF THE PRESENT INVENTION

The present invention overcomes the above-mentioned disadvantages by providing an axle beam particularly constructed to form a rigid support member which can be utilized to support a steering mechanism for the vehicle. Preferably, the axle beam is formed from two stamped sheet parts which form a tubular housing or beam which can be used as a front axle housing, a rear axle housing or both for a motor vehicle. A particularly advantageous feature of the present invention is that the axle beam can be used to support a steering mechanism for the wheels of the vehicle. In particular, the axle beam can be used as a supporting member for a steerable or rigid spindle support knuckle. In addition, the axle beam forms a supporting member for a steering control unit such as a steering gear assembly of a rack and pinion steering assembly.

In the preferred embodiment, the axle beam comprises an elongated member defining a longitudinal channel and a second elongated member longitudinally closing the channel. The first member preferably has a hat-shaped cross section including side flanges extending from the longitudinal edges of a base and end flanges extending outwardly from the side flanges. The second member includes surface portions along its longitudinal edges which matingly engage the end flanges and can be bonded together to form an integral, tubular structure. As used herein, the term "bonding" is used generally to refer to any manner of or combination of means for securing the mating surfaces such as welding, adhesives, bolting, riveting or the like. The structure can also be reinforced by corrugated web panels having margins that engage the peripheral walls of the enclosed channel, or by configurations formed during stamping of the elongated members.

The ends of the tubular beam can be enclosed by stamped end plates having an upper flange for supporting an upper knuckle coupling and a lower flange for supporting a lower knuckle coupling. When the axle beam is to be used for supporting the steerable wheels of the vehicle, the knuckle couplings are pivot joint couplings which can be of known construction. In addition, the side walls of the channel forming member provide a rigid support surface for mounting the steering assembly to the axle beam.

Thus, the present invention provides a simple but strong axle beam construction which is well adapted for mounting a steering assembly to the vehicle. Thus, the steering assembly mount of the present invention eliminates the multiple support points or compensating links for previously known steering mechanisms when the steering is supported with respect to the framing members of the vehicle. In addition, the axle beam permits easy installation of the differential gear housing and the axle shafts driven by the differential gear housing. These and other advantageous features of the present invention will be more clearly understood by reference to the following detailed description of a preferred embodiment of the present invention.

BRIEF DESCRIPTION OF THE DRAWING

The present invention will be more clearly understood by reference to the following detailed description of a preferred embodiment when read in conjunction with the accompanying drawing in which like reference characters refer to like parts throughout the views and in which:

FIG. 3 is an enlarged top plan view of the axle beam and steering assembly mount shown in FIG. 2 with portions broken away for the sake of clarity;

FIG. 4 is a sectional view taken substantially along the line 4—4 in FIG. 3; and FIG. 5 is a sectional view taken substantially along the line 5—5 in FIG. 3.

DETAILED DESCRIPTION OF A PREFERRED EMBODIMENT OF THE PRESENT INVENTION

Figure 1:
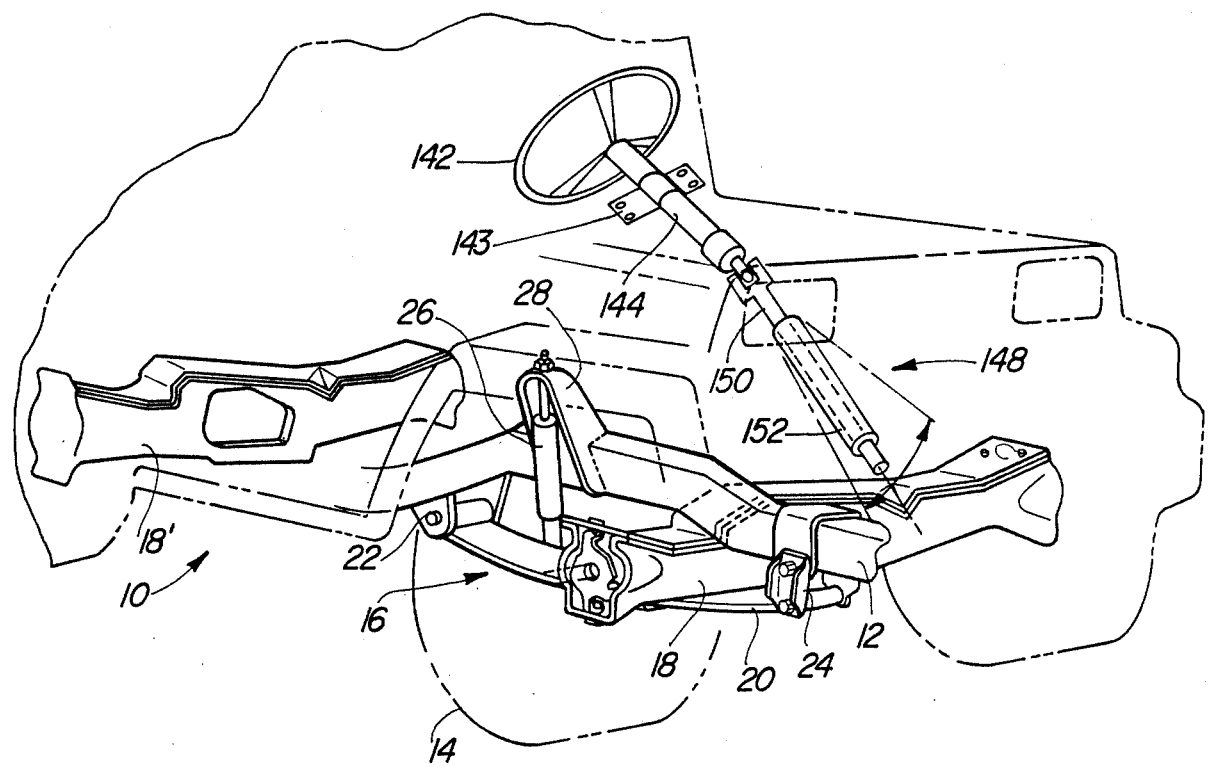
FIG. 1 is a fragmentary perspective view of a vehicle utilizing axle beams constructed in accordance with the present invention.

Referring first to FIG. 1, a motor vehicle 10 is thereshown comprising a pair of rail members 12 (one shown in FIG. 1) representing the frame of the vehicle 10. The wheels diagrammatically indicated at 14 are suspended from the frame by means of a suspension 16 including an axle beam 18 constructed in accordance with the present invention. Leaf springs 20 (one shown in FIG. 1) are secured intermediate their ends to an end of the axle beam 18 while the ends of each leaf spring 20 are secured relative to the frame. In FIG. 1, a frame supported pivot pin support bracket 22 fixedly positions one end of the spring leaf 20 while the spring shackle 24 secures the other end of the leaf spring 20 with respect to the frame at a portion of the frame rail 12 spaced apart from the support bracket 22. A shock absorber is bolted to a shock absorber support 28 secured to the frame rail 12, in a well known manner, while the other end of the shock absorber 26 is secured by appropriate means such as the bracket 30 (FIG. 3) in a similar manner to the axle beam 18. A substantially similar arrangement is provided on both the right and left sides of the vehicle. Moreover, a substantially similar arrangement can be provided at the rear of the vehicle 10 as diagrammatically indicated in FIG. 1 at 18'.

Figure 2:
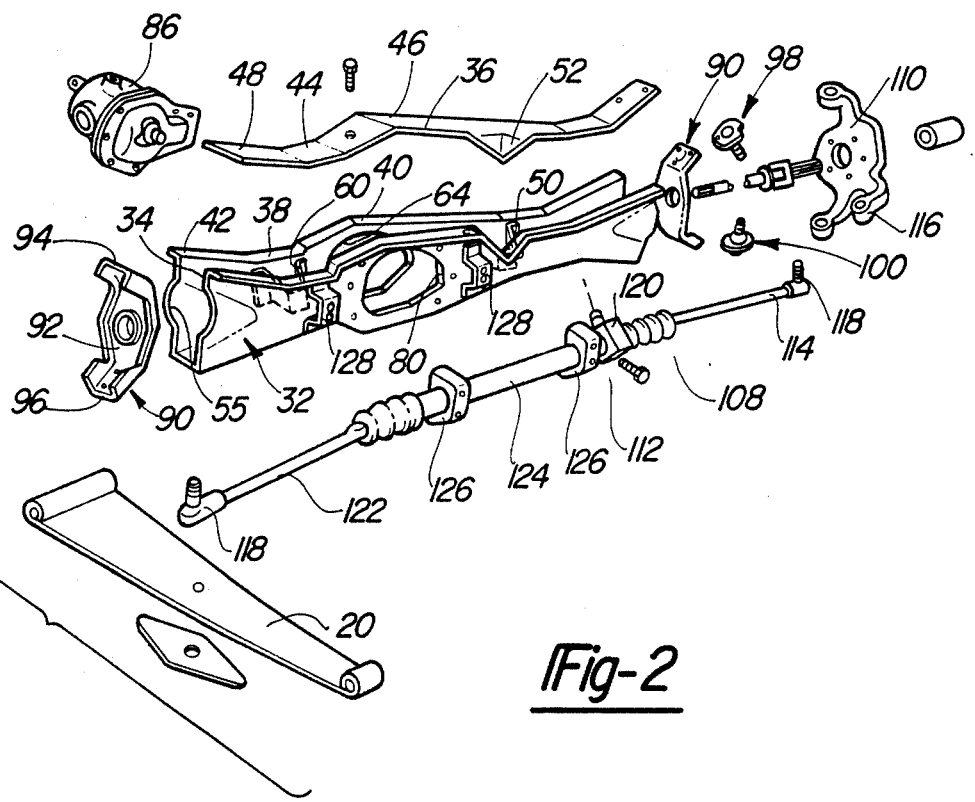
FIG. 2 is a exploded perspective view of a axle beam and steering assembly mount constructed in accordance with the present invention.

Referring now to FIG. 2, the axle beam 18 is thereshown comprising a first stamped part 32 in the form of an elongated member defining a channel 34. The channel 34 is longitudinally closed by a second part 36 also formed from an elongated member in the form of a stamped panel. The parts 32 and 36 are bonded together at the overlapping, mating surface portions, and it is to be understood that the term bonding or bonded is not to be understood as a limitation, but is used to refer to any manner of securing the mating portions together such as welding, bolting, riveting, adhesive compounds or the like.

The axle beam 18 can be provided with various configurations by providing correspondingly stamped portions on the first part 32 and the second part 36. As shown in FIG. 2, an intermediate portion 38 between the central portion 40 and end portion 42 on the part 32 correspond with portions 44, 46 and 48, respectively, on the second part 36. It will be appreciated that such constructions can be easily accomplished during stamping of each of the parts 32 and 36 from a flat panel. Thus, economies in the amount of material used to form each beam part or to accommodate the fitting of other vehicle parts can be incorporated in an axle beam 18 according to the present invention.

In addition, the axle beam 18 of the preferred embodiment includes a recess defined by detent portion 50 on part 32 which mates with detent portion 52 on the axle beam part 36. As best shown in FIG. 3, the detented portions 50 and 52 form a recess adapted to provide clearance for a steering shaft extending from the dash panel toward a steering gear box mounted in front of the axle beam.

In addition, the stamped panels can also include additional strengthening or reinforcing configurations. For example, in the preferred embodiment, the part 32 is generally formed in the shape of a hat section with sidewalls 54 extending outwardly from the longitudinally edges of a base 56 and which include outwardly extending end flanges 58. Portions of the upper part 36 overlap the end flanges 58 along a mating surface portion thereof to provide an expanded surface for bonding the second part 36 to the first part 32.

Additional strengthening of the axle beam 18 can also be provided by inserting corrugated web panels within the longitudinal channel 34. As best shown in FIG. 3, a corrugated web sheet 60 having alternating furrows and ridges is inserted in the longitudinal channel 34 adjacent the periphery of an opening 64 in a wall portion 54 of the first part 32. In the preferred embodiment, the web 60 comprises a stamped panel having a planar ridge panel 66 and two truncated furrow panels 68, the ridge and furrow panels being interconnected by planar webs 70. Each of the connecting webs 70 includes a flanged aperture 72 which enables an axle shaft 74 to extend unobstructed through the channel 34 of the axle beam 18 as shown in FIG. 3.

The planar ridge panel 66 defines a first margin of the web 60 while the furrow panels 68 define a second margin of the web 60. The corrugated sheet includes third and fourth margins at opposite ends of the first and second margins of the web sheet and formed by its longitudinal edges. Preferably, at least three of the four margins abuttingly engage peripheral walls of the channel 34, and can be bonded to the walls.

While the web reinforcements 60 are illustrative of an exemplary type of internal reinforcement which can be employed in the axle beam construction of the present invention, it is to be understood that internal reinforcements are not so limited and can be formed in any of the numerous ways taught in Applicant's co-pending application Ser. No. 839,799 which is incorporated herein by reference. Moreover, it is to be understood that such internal reinforcement is optional and need not be utilized in order to construct an axle beam within the scope of the present invention. However, such reinforcements will be preferred where the wall thickness of the sheets used to form the axle beam parts 32 and 34 is to be minimized.

Referring again to FIG. 2, the stamped part 32 includes registering apertures 60 and 80 formed in opposite sidewalls 54. As best shown in FIG. 3, the opening 64 is defined by a peripheral flange stamped outwardly from the wall 54. The flanged aperture 64 is large enough to permit insertion of the axle drive unit 86 within the longitudinal channel 34 of the axle beam 18. The opening 80 in the other sidewall 54 is defined by a peripheral wall portion 82 adapted to matingly engage an annular housing portion 84 of an axle drive unit 86. The overlapping surfaces of the peripheral wall portion 82 and an annular housing portion 84 can be bolted together, as shown in FIG. 3, or otherwise bonded together. Furthermore, structural rigidity of the axle beam 18 can also be provided by further attachment of the rigid axle drive housing to the axle beam. For example, and depending upon the shape of the axle drive housing, additional connections can be provided as shown by the bolt connection in solid line in FIG. 4 at 87 and as represented by the optional bolt connection in phantom line in FIG. 4 at 89.

A particularly advantageous feature of the axle beam of the present invention is that it can be used as a support for a steering mechanism. Referring again to FIG. 1, the steering mechanism 108 includes a steering actuator mechanism 140 including a steering wheel 142 secured to a fixed axis shaft 144 rotatably mounted for steering control in the passenger compartment as diagrammatically represented at bracket 143. The shaft 144 is coupled through a universal joint 146 to an intermediate shaft assembly 148. A first shaft 150 of the intermediate assembly 148 is telescopically received in a hollow shaft 152 for longitudinal sliding movement therealong while locked for rotation therewith, for example, by a spline connection in a well known manner. The end of the hollow shaft 152 is adapted to engage an input shaft of a steering control mechanism to be described hereinafter.

Referring now to FIG. 2, the steering assembly 108 also includes a wheel spindle support knuckle 110 and a steering control mechanism 112 which couples the steering actuator mechanism 140 to the steering knuckle 110. The knuckle 110 includes a spindle adapted to rotatably support a vehicle wheel hub on bearings or the like in a well known manner. Both the knuckle 110 and the control mechanism 112 are supported by the axle beam as will be described in greater detail hereinafter.

As best shown in FIGS. 2 and 5, the ends of the longitudinal channel 34 can be enclosed by stamped end plates 90 which not only add further rigidity to the axle beam structure but also provide a mount for the knuckle 110. In the preferred embodiment, each end plate 90 includes an apertured central portion 92, an upper flange 94 and a lower flange 96. Each part 90 is a unitary stamping wherein sidewalls extend outwardly from the longitudinal edges of the plate to form a longitudinal channel extending along the plate from the upper flange 94, across the central portion 92 and to the lower flange 96 to the other end. Preferably, as also shown in FIG. 2, the apertured central portion 92 of each end plate 90 has an expanded width which extends into corresponding recesses 55 formed in the sidewalls 54 of the stamped axle part 32.

As best shown in FIG. 5, upper flange 94 and lower flange 96 of each end plate 90 are adapted to support a knuckle support coupling such as the ball joints 98 and 100, respectively. Such ball joints can be of known construction and include pivot pins which are journalled within the support arms of a steering knuckle 110.

Referring now to FIGS. 2 and 3, a control rod 114 is pivotally journalled in a follower arm 116 of the steering knuckle 110 by an appropriate coupling 118. The control rod 114 extends outwardly from one side of a control unit 120 which, in the preferred embodiment, comprises a rack and pinion gear box assembly. A further control rod 122 extends outwardly from the opposite side of the gear box assembly 120 and also includes an appropriate coupling 118 for pivotally connecting the control rod 122 to a steering knuckle follower arm at the opposite end of the axle beam (not shown). The control rod 122 extends through a tubular housing 124 rigidly coupled to the housing of the rack and pinion gear box 120. The housing 124 is entrained by mounting blocks 126 adapted to receive a pair of bolts for attaching the housing 124 in a fixed position with respect to the axle beam 18. An input shaft extends outwardly from the gear box 120 so as to be engageable with the end of hollow shaft 152.

In the preferred embodiment, for ease of installation, a pair of channel brackets 128 have base tabs which are bonded by welding or other means to a sidewall 54 of the stamped part 32 so that a raised central portion of the bracket is spaced apart from the sidewall. The raised portions of the channel brackets 128 include apertures registering with the bolt holes in the mounting blocks 126 so that nuts 130 can be used to lock bolts within the registering apertures in the channel bracket 128 and the mounting block 126 as shown in FIG. 3.

As a result, it will be understood that the steering control mechanism 112 and the knuckle 110 are wholly supported by the axle beam 18 as shown in FIG. 3. Thus, the geometry of the steering mechanism remains continuously aligned with the axle beam regardless of the orientation of the axle beam 18 with respect to the frame during operation of the vehicle 10. Moreover, the intermediate shaft assembly 148 of the steering actuator mechanism 140 enables the actuator mechanism to remain coupled with the steering control mechanism 112 during movement of the axle. Moreover, the present invention provides additional rigidity to the steering assembly. Moreover, regardless of the degree of reinforcement necessary for the axle beam in order to support the steering assembly, the present invention provides various means for reinforcing the axle beam structure without increasing the gauge of the stamped panel used to form components from which the axle beam is formed.

Moreover, while an axle beam construction of the present invention is well adapted for use in supporting steerable wheels of the vehicles, the axle beam construction can also be utilized in conjunction with the non-steerable wheels of a motor vehicle. In particular, the flanges 94 and 96 of the end plates 90 can be used to rigidly secure a non-steerable spindle support by replacing the pivot couplings such as the ball joints 98 and 100 with known rigid couplings for securing a wheel spindle support to an axle housing. For example, knuckle support arms or other spindle supporting structure may be bolted or welded to the end plates 90. Nevertheless, it will be understood that an axle beam constructed with the stamped parts 32 and 36 used in forming the axle beam 18 can also be utilized in constructing the axle beam 18' so as to avoid the need for manufacturing different front and rear axle housings. Alternatively, the rear axle beam can be formed from stamped plates without the complex configurations such as mating portions 42 and 48, 38 and 44, 40 and 46, and 50 and 52, in order to reduce the production cost of each axle assembly.

Having thus described the present invention, many modifications thereto will become apparent to those skilled in the art to which it pertains without departing from the scope and spirit of the present invention as defined in the appended claims.

What is claimed is:

1. An axle beam for supporting drivetrain components of a motor vehicle having wheel spindle support knuckles comprising:
   - a first elongated channel member having a substantially hat-shaped cross section including first and second sidewalls, a bottom wall having a longitudinal edge at one edge of each of said sidewalls, and side flanges extending outwardly from the other edges of said sidewalls;
   - a second elongated member having side portions registering with said side flanges for enclosing said channel;
   - means for bonding said side flanges to said side portions and thereby forming a hollow beam; and
   - an end plate formed by sheet stamping secured at each longitudinal end of said first and second elongated members including means for mounting one of the wheel spindle support knuckles to said axle beam.

2. The invention as defined in claim 1 and further comprising means for supporting a steering control assembly on one of said first and second sidewalls.

3. The invention as defined in claim 1 and further comprising at least one web panel secured between said first and second member, said web panel comprising an elongated sheet having alternating furrows and ridges and including aligned apertures axially aligned with said channel.

4. The invention as defined in claim 1 wherein said vehicle includes at least one axle drive housing and further comprising aperture means formed in said first elongated member for receiving and supporting the axle drive housing.

5. The invention as defined in claim 4 wherein said aperture means comprises at least one flanged aperture formed in said first elongated member.

6. The invention as defined in claim 4 wherein said aperture means includes:
a first aperture in said first sidewall adapted to receive said axle drive housing, and
a second aperture in said second sidewall peripherally defined by a housing portion adapted to matingly engage a portion of said axle drive housing, whereby said axle drive housing reinforces said axle beam.

7. The invention as defined in claim 1 wherein said first and second member form an enclosed channel having a substantially rectangular cross section.

8. The invention as defined in claim 1 wherein said axle beam includes an elongated corrugated web reinforcement sheet.

9. The invention as defined in claim 8 wherein said web sheet includes alternating furrows and ridges, defining first and second margins and having third and fourth margins defined by the longitudinal edges of said sheet, and wherein at least three of said first, second, third and fourth margins engage the periphery of said enclosed channel.

10. The invention as defined in claim 8 wherein said corrugated sheet includes longitudinally aligned apertures.

11. The invention as defined in claim 1 wherein said means for mounting one of the wheel spindle support knuckles includes an end plate having an apertured central portion, an upper flange at one end of said central portion and a lower flange at the other end.

12. The invention as defined in claim 11 wherein said end plate is stamped to form a channel extending from one end to said other end.

13. The invention as defined in claim 12 wherein said means for mounting further includes means for pivotally securing a wheel spindle support knuckle to said axle beam.

14. The invention as defined in claim 13 wherein a pivot coupling is secured to each of said upper and lower flanges.

15. The invention as defined in claim 2 wherein said control assembly includes a mounting block and means for bolting said mounting block to said axle beam.

16. The invention as defined in claim 15 wherein said means for bolting comprises a channel bracket secured to one of said first and second sidewalls.

17. The invention as defined in claim 1 wherein at least one of said sidewalls includes an opening dimensioned to receive an axle drive housing.

18. The invention as defined in claim 1 wherein said first and second elongated members are formed by sheet stamping.

19. A steering assembly mount for a motor vehicle having a steering actuator mechanism, two steering spindle support knuckles and a steering control mechanism coupling said steering actuator mechanism to said steering spindle support knuckles, said mount comprising:
a tubular axle beam;
means for supporting the steering control assembly in a fixed position with respect to said tubular axle beam;
means for pivotally securing one wheel spindle support knuckle at each end of said tubular axle beam;
wherein said tubular axle beam comprises a first elongated member having a longitudinal channel;
a second elongated member bonded to said first member for longitudinally enclosing said channel; and
an end plate formed by sheet stamping secured at each longitudinal end of said beam formed from said first and second elongated members,
wherein said end plate supports said means for pivotally securing.

20. The invention as defined in claim 19 wherein said first member has a substantially hat-shaped cross section including first and second sidewalls, a bottom wall having a longitudinal edge at one edge of each of said sidewalls, and side flanges extending outwardly from the other edges of the sidewall, and wherein said means for supporting comprises means for supporting a steering control assembly on one of said first and second sidewalls.

21. A vehicle suspension for resiliently suspending driven wheels from a motor vehicle frame comprising:
a first elongated channel member having a substantially hat-shaped cross section including first and second sidewalls extending from an elongated base, and side flanges extending outwardly from the edges of said sidewalls;
a second elongated member having side portions registering with said side flanges for enclosing said channel;
means for bonding said side flanges to said side portions and thereby forming a hollow beam; and
an end plate secured at each longitudinal end of said first and second elongated members including means for mounting one of the wheel spindle support knuckles to said axle beam;
spring means secured to said axle beam and the vehicle frame for resiliently mounting said frame with respect to said axle beam;
a wheel spindle support knuckle coupled at each end of said axle beam wholly supported by said axle beam;
an axle drive unit having a rigid housing with surfaces overlapping portions of said axle beam; and
aperture means formed in said first elongated member for receiving said axle drive housing within said axle beam.

22. An axle beam for supporting drivetrain components of a motor vehicle having wheel spindle support knuckles comprising:
a first elongated channel member having a substantially hat-shaped cross section including first and second sidewalls extending from a base, and side flanges extending outwardly from the edges of said sidewalls;
a second elongated member having side portions registering with said side flanges for enclosing said channel;
means for bonding said side flanges to said side portions and thereby forming a hollow beam;
an end plate formed by sheet stamping secured at each longitudinal end of said first and second elongated member including means for mounting one of the wheel spindle support knuckles to said axle beam; and wherein said means for mounting one of the wheel spindle support knuckles includes said end plate having a central portion, an upper flange at one end of said central portion and a lower flange at the other end of said central portion.

23. The invention as defined in claim 22 and further comprising means for reinforcing said upper and lower flanges wherein said reinforcing means includes said upper flange and said lower flange overlapping said upper and lower members of said beam respectively.

24. A motor vehicle wheel suspension for supporting vehicle wheels with respect to the vehicle frame, comprising:
   a tubular axle beam;
   spring means secured to said axle beam and the vehicle frame for resiliently mounting said frame with respect to said axle beam;
   a steering mechanism having wheel spindle support knuckles, wherein said axle beam includes end plates having means for pivotally securing a wheel spindle support knuckle at each end of said axle beam;
   a steering actuator, said steering actuator including a fixed axis shaft, an intermediate shaft assembly having first and second shafts supported for longitudinal sliding movement with direct mechanical locking for rotation, and a universal joint for coupling said fixed axis shaft to said intermediate assembly; and
   a steering control mechanism for coupling the steering actuator to said wheel spindle support knuckles, said steering control mechanism being mounted to said axle beam for unsprung movement therewith.

* * * * *